United States Patent
Shin et al.

(10) Patent No.: US 9,544,513 B2
(45) Date of Patent: Jan. 10, 2017

(54) IMAGE SENSOR HAVING PIXEL ARCHITECTURE FOR CAPTURING DEPTH IMAGE AND COLOR IMAGE

(71) Applicant: SAMSUNG ELECTRONICS CO., LTD., Suwon-si, Gyeonggi-do (KR)

(72) Inventors: Jung Soon Shin, Yongin-si (KR); Seong Jin Kim, Seoul (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 515 days.

(21) Appl. No.: 13/927,414

(22) Filed: Jun. 26, 2013

(65) Prior Publication Data

US 2014/0104397 A1 Apr. 17, 2014

(30) Foreign Application Priority Data

Oct. 16, 2012 (KR) ........................ 10-2012-0114940

(51) Int. Cl.
| | |
|---|---|
| H04N 13/02 | (2006.01) |
| H04N 9/04 | (2006.01) |
| H04N 5/33 | (2006.01) |
| H04N 5/347 | (2011.01) |
| H04N 5/378 | (2011.01) |
| H04N 5/3745 | (2011.01) |

(52) U.S. Cl.
CPC .............. *H04N 5/347* (2013.01); *H04N 5/332* (2013.01); *H04N 5/378* (2013.01); *H04N 5/3745* (2013.01); *H04N 9/045* (2013.01); *H04N 13/0257* (2013.01)

(58) Field of Classification Search
None
See application file for complete search history.

(56) References Cited

U.S. PATENT DOCUMENTS

| | | | |
|---|---|---|---|
| 7,965,329 B2 | 6/2011 | McCarten et al. | |
| 2004/0263652 A1* | 12/2004 | Oda | ........................ H04N 9/045 348/272 |
| 2006/0274176 A1* | 12/2006 | Guidash | ............ H01L 27/14643 348/300 |
| 2009/0218476 A1* | 9/2009 | Kameshima | ............. A61B 6/00 250/208.1 |
| 2009/0295959 A1* | 12/2009 | Shoho | ..................... H04N 5/378 348/294 |
| 2010/0225795 A1 | 9/2010 | Suzuki et al. | |
| 2011/0128425 A1* | 6/2011 | Schemmann | ........ H04N 3/1562 348/300 |

FOREIGN PATENT DOCUMENTS

| | | |
|---|---|---|
| KR | 10-2011-0014089 | 2/2011 |
| KR | 10-2011-0024242 | 3/2011 |
| KR | 10-2011-0026891 | 3/2011 |
| KR | 10-2011-0093382 | 8/2011 |

\* cited by examiner

*Primary Examiner* — Mark T Monk
(74) *Attorney, Agent, or Firm* — Harness, Dickey & Pierce, P.L.C.

(57) ABSTRACT

An image sensor having a pixel architecture for capturing a depth image and a color image. The image sensor may be configured in a pixel architecture in which a floating diffusion (FD) node is shared, and may operate in different pixel architectures in a depth mode and a color mode, respectively.

15 Claims, 18 Drawing Sheets

ROW 4n

ROW 4n+1

ROW 4n+2

ROW 4n+3

IMAGE SENSOR HAVING PIXEL ARCHITECTURE FOR CAPTURING DEPTH IMAGE AND COLOR IMAGE

CROSS-REFERENCE TO RELATED APPLICATIONS

This application claims the priority benefit of Korean Patent Application No. 10-2012-0114940, filed on Oct. 16, 2012, in the Korean Intellectual Property Office, the disclosure of which is incorporated herein by reference.

BACKGROUND

1. Field

Example embodiments of the following disclosure relate to an image sensor having a pixel architecture for capturing a depth image and a color image, and more particularly, to an image sensor having a pixel architecture including pixels sharing a floating diffusion (FD) node.

2. Description of the Related Art

In order to capture a three-dimensional (3D) image of an object, a color image and a depth image of the object may be extracted simultaneously. Capturing a 3D image using a conventional image photographing apparatus may be difficult because the image photographing apparatus extracts only a color image of an object. As such, it may be difficult to obtain depth information from the color image alone.

To resolve such difficulties, as a method of extracting a depth image of an object, a time of flight (TOF) process by which a light may be radiated, and a TOF of the light may be verified by sensing a light reflected by the object, may be employed.

Further, a size of a pixel used in a depth camera extracting a depth image may be in a range of about 30 to 40 micrometers (μm). In addition, a size of a pixel used in a color camera extracting a color image may be in a range of about 1.4 to 3.6 μm.

In order to generate a 3D image, both the depth image and the color image may be obtained. Accordingly, in order to extract both the depth image and the color image using a pixel, it may be necessary to reduce a size of the pixel. However, when the size of the pixel is reduced, a size of a photodiode included in the pixel may be reduced, and a sensitivity of the photodiode may decrease. As the sensitivity of the photodiode decreases, a degree of precision for measuring the depth may also decrease. Accordingly, securing a maximum size of the photodiode may be necessary.

SUMMARY

The foregoing and/or other aspects are achieved by providing an image sensor, including a first pixel, a second pixel, and a control switch to control an electrical connection between a first floating diffusion (FD) node of the first pixel and a second FD node of the second pixel.

The control switch may electrically connect the first FD node and the second FD node in a color mode for capturing a color image, and may release the electrical connection between the first FD node and the second FD node in a depth mode for capturing a depth image.

At least one of the first pixel and the second pixel may include a pixel readout circuit connected to the second FD node.

The first pixel and the second pixel may sense at least one of a visible light and an infrared ray.

The foregoing and/or other aspects are achieved by providing an image sensor, including a pixel array unit configured in an m×n pixel architecture, a first column readout circuit connected to all columns included in the pixel array unit, and disposed above the pixel array unit to remove a noise of a pixel and to convert a pixel value into a digital signal, a second column readout circuit connected to all of the columns included in the pixel array unit, and disposed under the pixel array unit to remove a noise of a pixel and to convert a pixel value into a digital signal, a first switch unit disposed between the pixel array unit and the first column readout circuit to switch a connection between a column of the pixel array unit and the first column readout circuit, based on a control of a control unit, a second switch unit disposed between the pixel array unit and the second column readout circuit to switch a connection between a column of the pixel array unit and the second column readout circuit, based on the control of the control unit, and the control unit to control the first switch unit and the second switch unit for green pixels, among pixels included in the m×n pixel architecture, to be read out by one of the first column readout circuit and the second column readout circuit.

The control unit may control the first switch unit for the green pixels, among the pixels included in the m×n pixel architecture, to be read out by the first column readout circuit, and may control the second switch unit for blue pixels and red pixels, among the pixels included in the m×n pixel architecture, to be read out by the second column readout circuit.

The control unit may control the second switch unit for the green pixels, among the pixels included in the m×n pixel architecture, to be read out by the second column readout circuit, and may control the first switch unit for blue pixels and red pixels, among the pixels included in the m×n pixel architecture, to be read out by the first column readout circuit.

The pixels included in the m×n pixel architecture of the pixel array unit may share an FD node present in an identical column, and a pixel readout circuit connected to the FD node.

Different signals may be input into the pixels included in the m×n pixel architecture, respectively, in a color mode, and an identical signal may be input into the pixels included in the m×n pixel architecture, in a depth mode.

A pixel included in the m×n pixel architecture may share the FD node with a neighboring pixel, in a depth mode.

The m×n pixel architecture may correspond to a 4×2 pixel architecture.

Pixels included in the 4×2 pixel architecture may share a single FD node in a depth mode.

The pixel array unit may include a first pixel, a second pixel, and a control switch to control an electrical connection between a first FD node of the first pixel and a second FD node of the second pixel.

Further, charges of pixels are transferred in one of a horizontal and vertical direction to a shared FD node.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
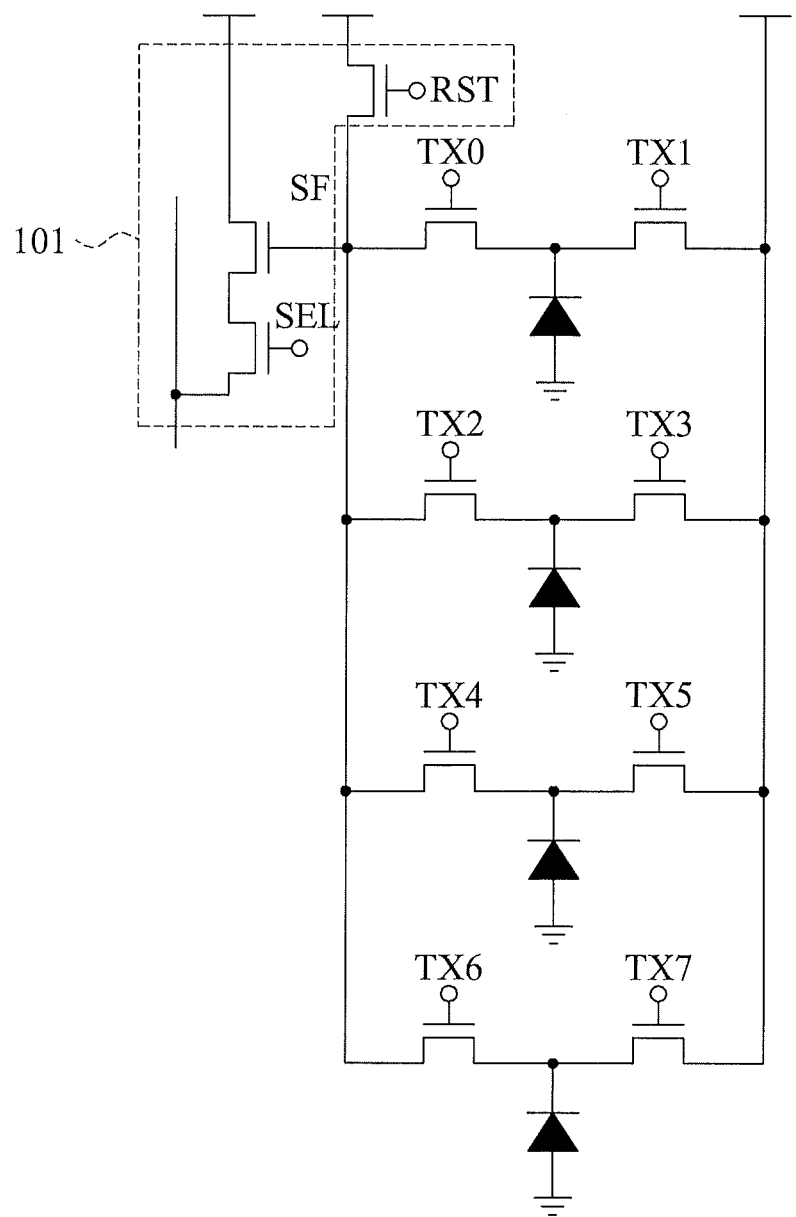
FIG. 1 illustrates a 4-shared color/depth pixel architecture, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a 4-shared color/depth pixel architecture, according to example embodiments.

Referring to FIG. 1, an image sensor may include four pixels, each pixel having two transfer gates. Here, each pixel may be connected to three transistors, for example, a reset (RST) transistor, a select (SEL) transistor, and a source follower (SF) transistor.

In FIG. 1, a first pixel may include a transfer gate TX0 and a transfer gate TX1, and a second pixel may include a transfer gate TX2 and a transfer gate TX3. Similarly, a third pixel may include a transfer gate TX4 and a transfer gate TX5, and a fourth pixel may include a transfer gate TX6 and a transfer gate TX7. Accordingly, depending on embodiments, the image sensor of FIG. 1 may be provided in a 4×1 pixel architecture.

In this instance, the four pixels may share a single pixel readout circuit 101. For example, the single pixel readout circuit 101 may include the RST, SEL, and SF transistors. A pixel may be selected in response to a signal input through the SEL transistor. A detailed operation of the image sensor of FIG. 1 will be described further with reference to FIG. 2.

Figure 2:
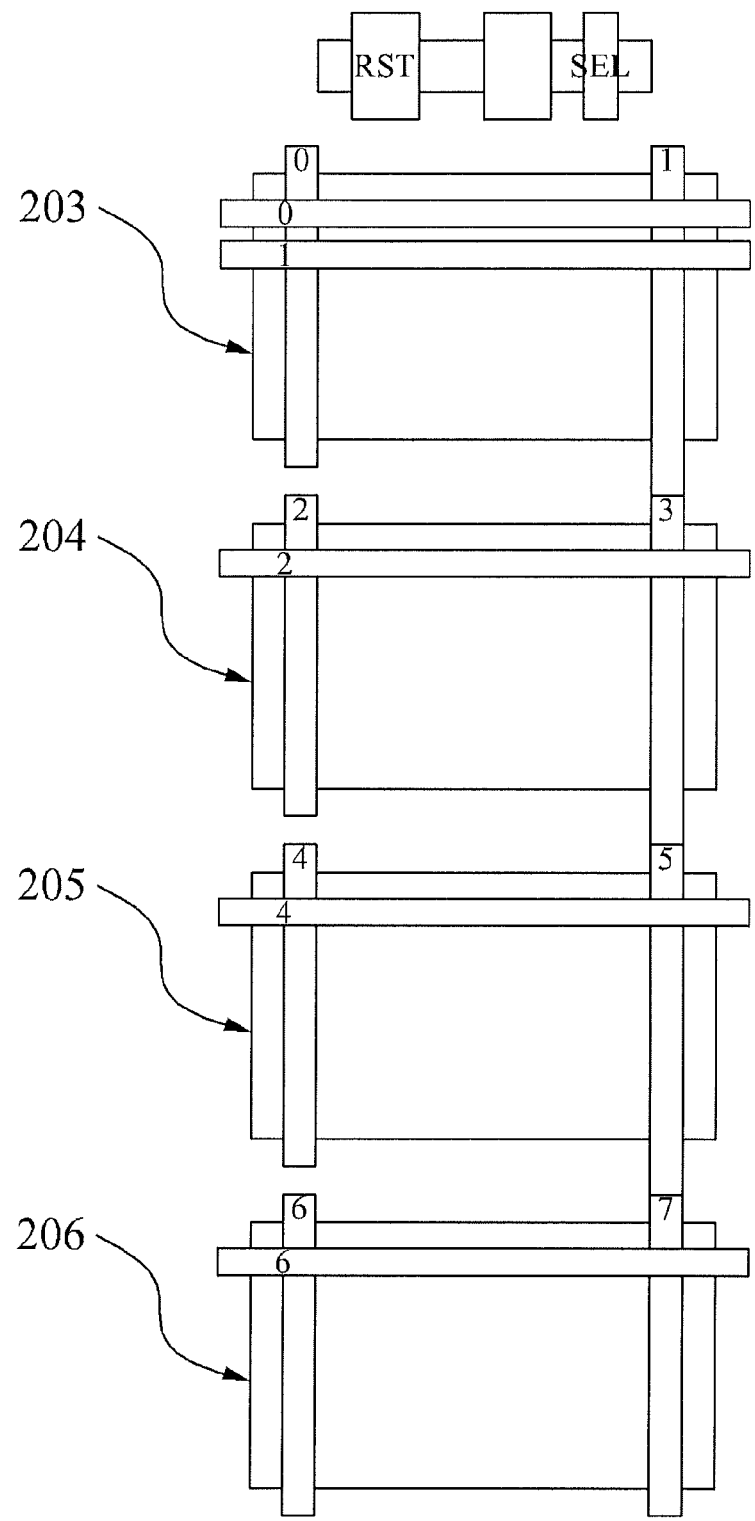
FIG. 2 illustrates an exemplary layout of the pixel architecture of FIG. 1.

FIG. 2 illustrates an exemplary layout of the pixel architecture of FIG. 1.

Referring to FIG. 2, a first pixel 203 may include a transfer gate 0 and a transfer gate 1, a second pixel 204 may include a transfer gate 2 and a transfer gate 3, a third pixel 205 may include a transfer gate 4 and a transfer gate 5, and a fourth pixel 206 may include a transfer gate 6 and a transfer gate 7.

In a color mode, a signal may be inputted into only transfer gates TX2n, and the respective pixels may operate independently. For example, only the transfer gates 0, 2, 4, and 6 may be operated. Accordingly, the first pixel 203, the second pixel 204, the third pixel 205, and the fourth pixel 206 may be controlled based on different signals, however, the present disclosure is not limited thereto.

In a depth mode, a signal may be inputted into only transfer gates TX2n+1. In particular, all of the transfer gates 0 to 7 may be operated. In this instance, the transfer gates TX2n+1 may be shared by all of the first pixel 203, the second pixel 204, the third pixel 205, and the fourth pixel 206. Accordingly, the first pixel 203, the second pixel 204, the third pixel 205, and the fourth pixel 206 may be controlled based on an identical signal. In other words, the transfer gates 1, 3, 5, and 7 may operate in response to an identical signal and thus, the first pixel 203, the second pixel 204, the third pixel 205, and the fourth pixel 206 may share an identical row, as shown by transfer gates 1, 3, 5, and 7 in FIG. 2.

Figure 3:
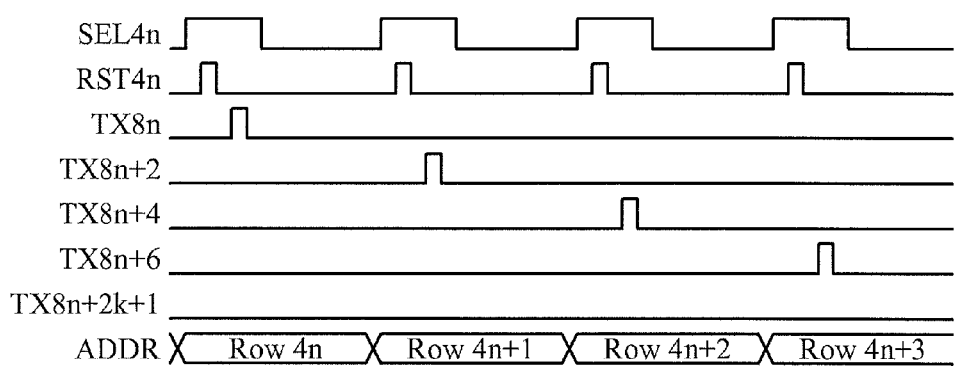
FIG. 3 illustrates an exemplary timing diagram for a color mode of a pixel architecture, according to example embodiments.

FIG. 3 illustrates a timing diagram for a color mode of a pixel architecture according to example embodiments.

Referring to FIG. 3, in the color mode, a signal input into a pixel may indicate a rolling shutter operation. As discussed above, in the color mode, gates 0, 2, 4, and 6 may be operated and each pixel may be controlled by different signals. A transfer gate may be connected at a time of reading out a line of each pixel, and charges collected in a photodiode of the pixel may be transferred to a floating diffusion (FD) node.

Figure 4:
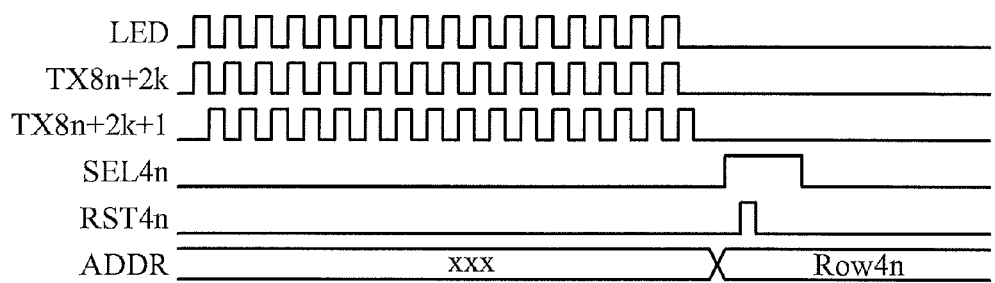
FIG. 4 illustrates an exemplary timing diagram for a depth mode of a pixel architecture, according to example embodiments.

FIG. 4 illustrates a timing diagram for a depth mode of a pixel architecture according to example embodiments.

Referring to FIG. 4, a light emitting diode (LED) signal and a transmission (TX) signal may be synchronized in the depth mode. The TX signal may operate globally, charges may be accumulated for an integration time during which a signal modulated in the LED may be output, and the charges may be read out for each row, similar to the color mode.

Figure 5:
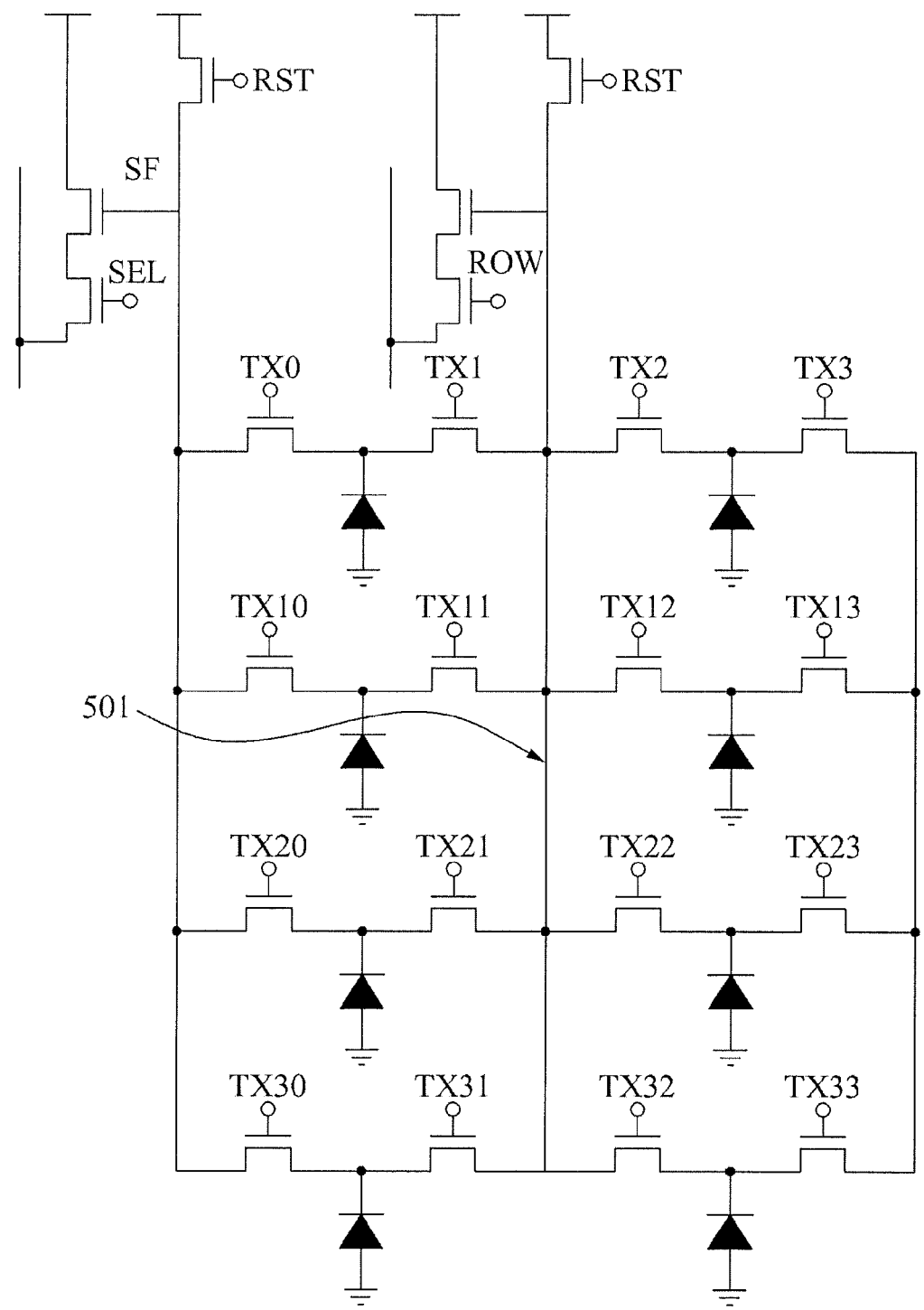
FIG. 5 illustrates an exemplary 4×2 pixel architecture in which a floating diffusion (FD) node is shared with a neighboring pixel, according to example embodiments.

FIG. 5 illustrates an exemplary 4×2 pixel architecture in which an FD node is shared with a neighboring pixel, according to example embodiments.

An image sensor having the 4×2 pixel architecture of FIG. 5 may indicate an image sensor having two 4×1 pixel architectures of FIG. 1. Referring to FIG. 5, the image sensor may include four pixels sharing an RST transistor, an SEL transistor, and an SF transistor.

In this instance, two pixels may share a single FD node 501, whereby the image sensor may increase a fill factor. The image sensor may read out signals applied to FD nodes, simultaneously.

In a color mode, the image sensor may select a column line corresponding to green, or red/blue, based on a control of a transfer gate. In a depth mode, the image sensor may be changed to an 8-shared architecture in which 8 pixels may share an FD node.

Figure 6:
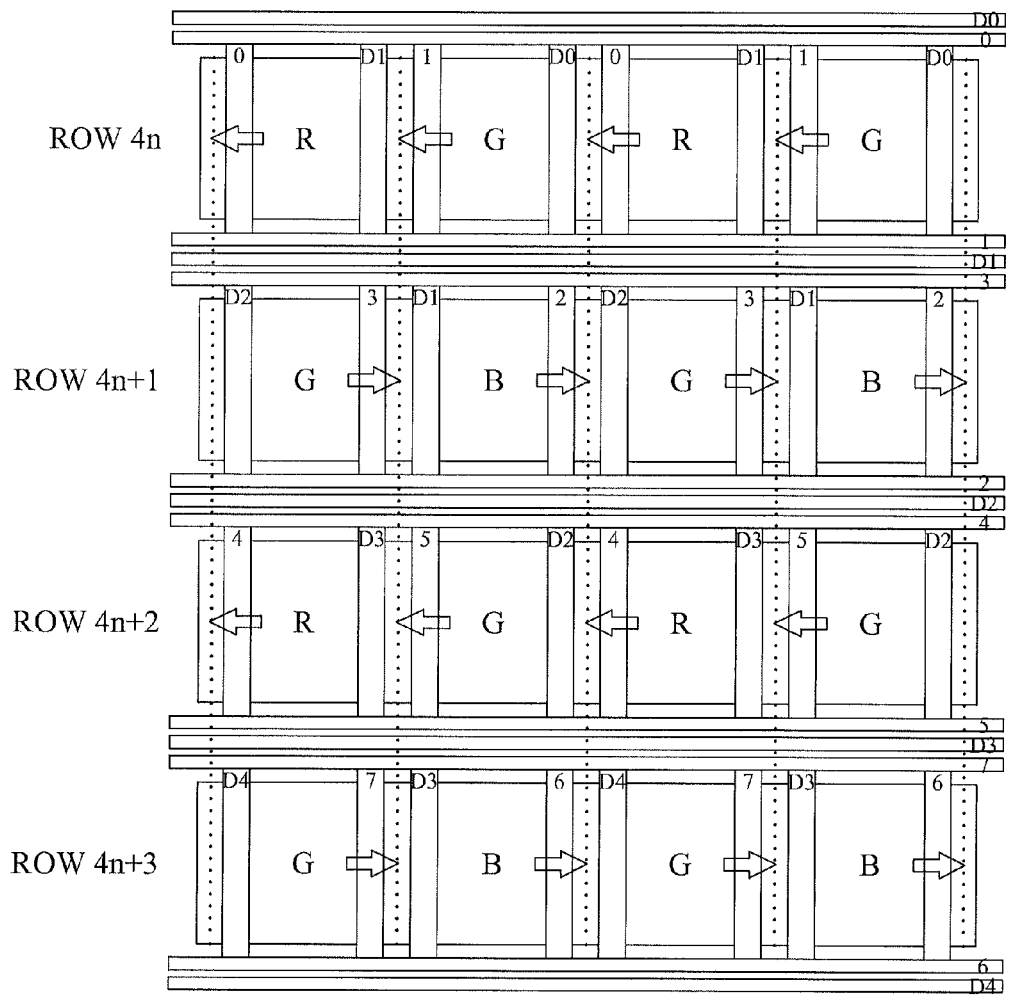
FIG. 6 illustrates an exemplary first layout of a 4×4 pixel architecture in which an FD node is shared with a neighboring pixel in a color mode, according to example embodiments.

FIG. 6 illustrates an exemplary first layout of a 4×4 pixel architecture in which an FD node is shared with a neighboring pixel in a color mode, according to example embodiments.

In FIG. 6, directions of charge transfer in an image sensor having a 4×4 pixel architecture in a color mode are illustrated. Referring to FIG. 6, transfer gates are divided into transfer gates 0 to 7, and transfer gates D0 to D4. A horizontal line may indicate a row signal line which may be shared by all pixels in a row. A vertical line may indicate a transfer gate. Numbers indicated on a line may indicate a connection. For example, a ROW 0 signal line may be connected to a transfer gate 0. For example, in the color mode, only the transfer gates 0 to 7 may be operated. In FIG. 6, for example, a dotted line in a vertical direction may indicate an FD node being shared.

When the transfer gate 0 and the transfer gate 1 are operated, charges of red pixels (R) in a ROW 4*n* may be transferred to left FD nodes, and charges of green pixels (G) in the ROW 4*n* may be transferred to left FD nodes. When the transfer gate 2 and the transfer gate 3 are operated to read out pixel values of a ROW 4*n*+1, charges of green pixels and blue pixels (B) in the ROW 4*n*+1 may be transferred to right FD nodes, and a readout operation may be performed sequentially.

Here, the charges of the pixels in the ROW 4*n* and the charges of the pixels in the ROW 4*n*+1 may be transferred to FD nodes of different directions in order to minimize a mismatch between a green pixel next to a red pixel, and a green pixel next to a blue pixel. Hereinafter, for clarity purposes, the green pixel next to a red pixel will be referred to as a Gr pixel and the green pixel next to a blue pixel will be referred to as a Gb pixel. The image sensor may set directions of charge transfer to be different in order to transfer the charges of the Gr pixel and Gb pixel to an identical FD node. In particular, according to the image sensor of FIG. 6, a sensitivity of the image sensor may be increased by sharing the FD node, and a color sense may be increased by separating color channels of R/B, and G. However, the directions indicated above for the transferring of the charges are exemplary, and thus, the present disclosure is not limited thereto.

Referring to FIG. 6, the image sensor may control operations of transfer gates for each ROW, thereby combining FD nodes of green pixels disposed in different columns into one.

Figure 7:
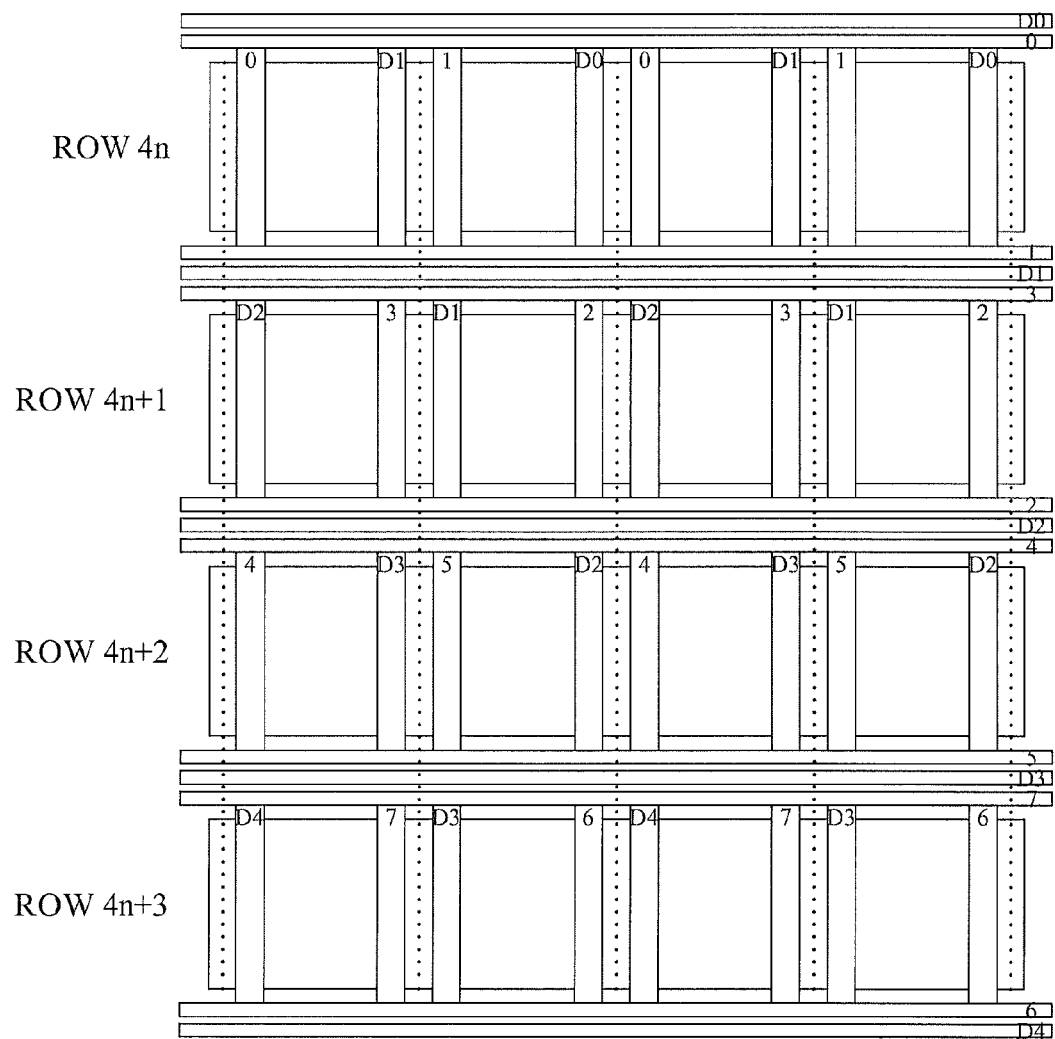
FIG. 7 illustrates an exemplary first layout of a 4×4 pixel architecture in which an FD node is shared with a neighboring pixel in a depth mode, according to example embodiments.

FIG. 7 illustrates an exemplary first layout of a 4×4 pixel architecture in which an FD node is shared with a neighboring pixel in a depth mode according to example embodiments.

Referring to FIG. 7, in the depth mode, all of transfer gates 0 to 7 and transfer gates D0 to D4 may be operated. In this instance, charges may be transferred to both gates, and thus, directions of charge transfer have not been indicated separately. Accordingly, all pixels included in an image sensor may operate simultaneously, and a depth image may be captured.

Figure 8:
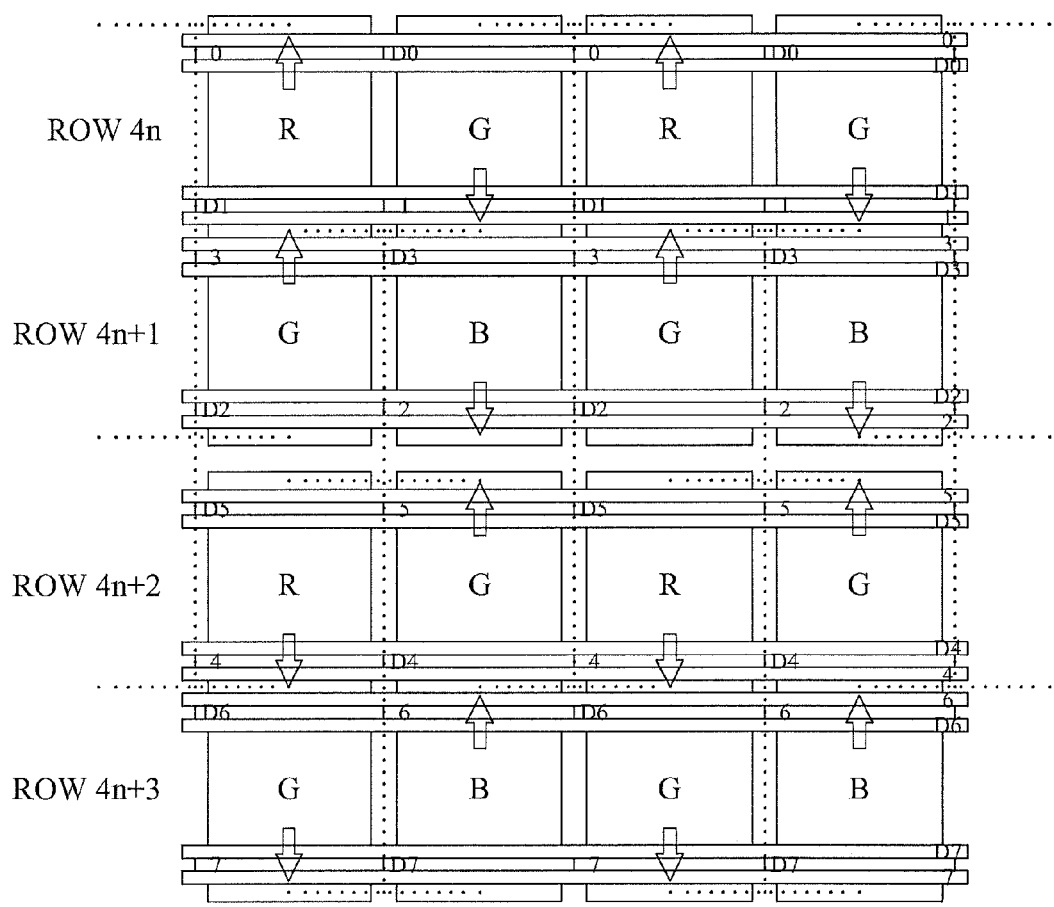
FIG. 8 illustrates an exemplary second layout of a 4×4 pixel architecture in which an FD node is shared with a neighboring pixel in a color mode, according to example embodiments.

FIG. 8 illustrates an exemplary second layout of a 4×4 pixel architecture in which an FD node is shared with a neighboring pixel in a color mode, according to example embodiments.

The 4×4 pixel architecture of FIG. 8 may differ from the 4×4 pixel architecture of FIG. 6. Charges may be transferred in a horizontal direction in FIG. 6, whereas charges may be transferred in a vertical direction in FIG. 8. However, an operating principle of the 4×4 pixel architectures of FIG. 6 and FIG. 8 may be identical. In the color mode, transfer gates 0 to 7 may be operated. Similar to FIG. 6, a dotted line may indicate an FD node being shared. For example, in FIG. 8, the dotted lines indicating the shared FD node may be both in a horizontal and a vertical direction.

When the transfer gate 0 and the transfer gate 1 are operated, charges of red pixels corresponding to a ROW 4*n* may be transferred to upper FD nodes, and changes of green pixels corresponding to the ROW 4*n* may be transferred to lower FD nodes.

When the transfer gate 2 and the transfer gate 3 are operated to read out pixel values corresponding to a subsequent row, ROW 4*n*+1, charges included in green pixels may be transferred to upper FD nodes, and charges included in blue pixels may be transferred to lower FD nodes.

Referring to FIG. 8, operations of transfer gates may be controlled for each ROW, whereby FD nodes of green pixels disposed in different columns may be combined into one. Similar to FIG. 6, a mismatch between a green pixel next to a red pixel and a green pixel next to a blue pixel may be minimized.

Figure 9:
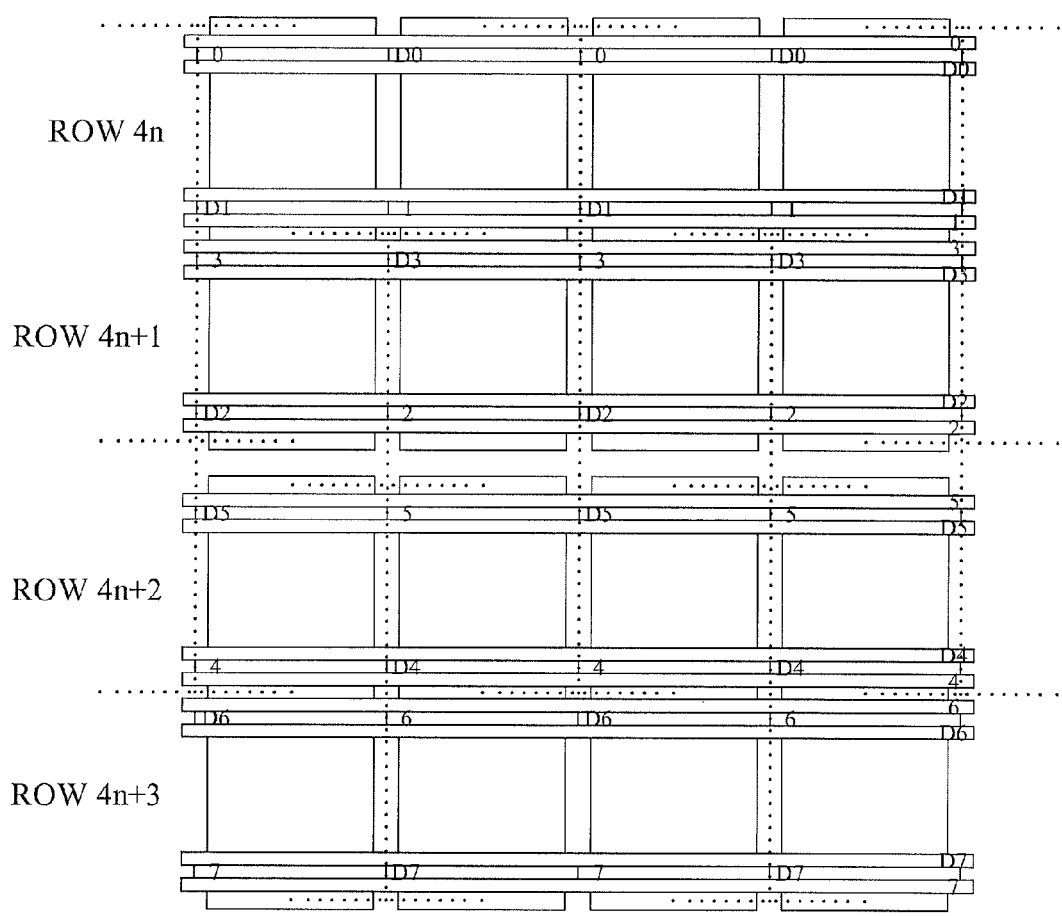
FIG. 9 illustrates an exemplary second layout of a 4×4 pixel architecture in which an FD node is shared with a neighboring pixel in a depth mode, according to example embodiments.

FIG. 9 illustrates an exemplary second layout of a 4×4 pixel architecture in which an FD node is shared with a neighboring pixel in a depth mode according to example embodiments.

Referring to FIG. 9, in the depth mode, all of transfer gates 0 to 7 and transfer gates D0 to D7 may be operated. As described with reference to FIG. 7, all pixels included in an image sensor may operate simultaneously, and a depth image may be captured.

Figure 10:
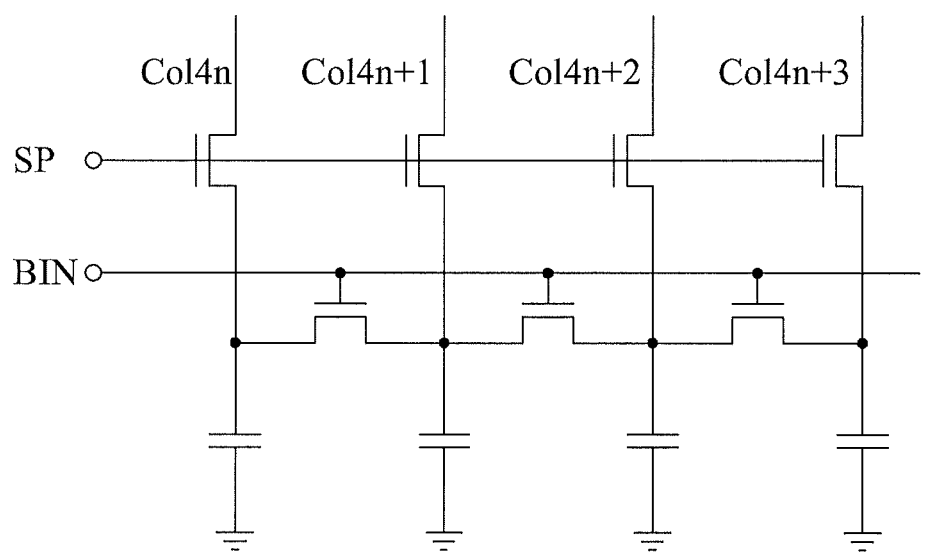
FIG. 10 illustrates an exemplary circuit for pixel binning in an analog domain, according to example embodiments.

FIG. 10 illustrates a circuit for pixel binning in an analog domain, according to example embodiments.

An operation of the circuit of FIG. 10 will be described hereinafter.

When an SP signal is ON, a column values of each column may be stored in a capacitor. When the SP signal is OFF, a binning (BIN) signal may be ON such that changes stored in four capacitors may be averaged, and a binning effect may be produced.

Figure 11:
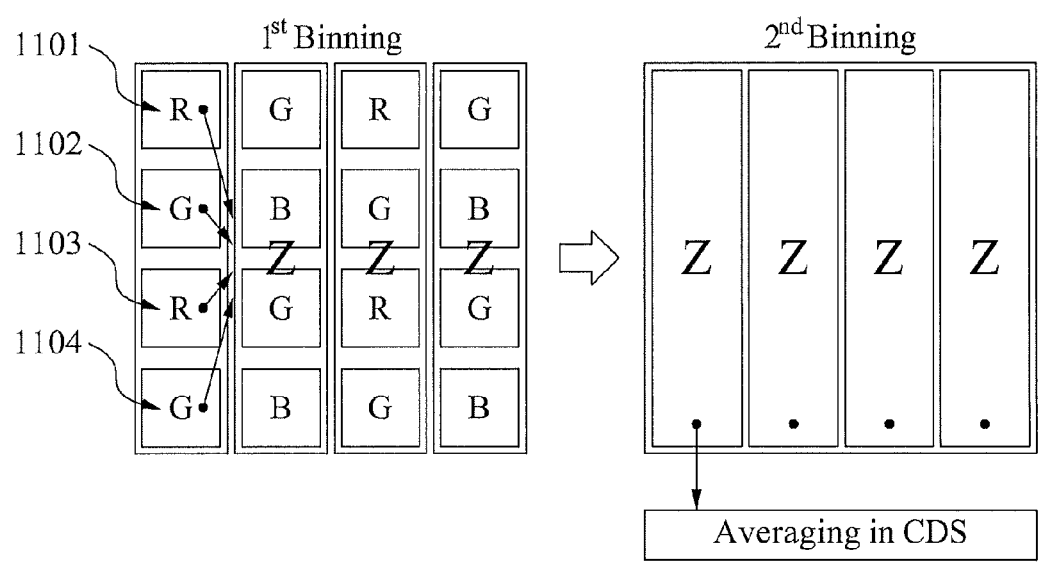
FIG. 11 illustrates hierarchical binning of sequentially performing pixel binning in a charge domain and pixel binning in an analog domain, according to example embodiments.

FIG. 11 illustrates hierarchical binning of sequentially performing pixel binning in a charge domain and pixel binning in an analog domain, according to example embodiments.

Referring to FIG. 11, images sensed by pixels 1101, 1102, 1103, and 1104 may be primarily binned in the charge domain, and may be displayed as a single "Z." Here, an image sensor configured in a 4×1 pixel architecture may be set to be a single unit, and accordingly, a single Z may be displayed. As shown in FIG. 11, the image sensor configured in the 4×1 pixel architecture may display a total of four Zs. As another example, an image sensor configured in a 4×2 pixel architecture may be set to be a single unit.

In the analog domain, the four Zs derived from the image sensor set to be a single unit may be binned, and displayed as a single large Z. In particular, an image displayed in the analog domain may produce an effect of binning all image displayed in sixteen pixels in the charge domain. An operation of a circuit for analog binning has been described in detail with respect to FIG. 10, and thus, a detailed description will be omitted here.

A conversion gain of the pixel may be reduced because the 4×2 pixel architecture of FIG. 5 may basically share an FD node within a pixel. In this instance, a conversion gain may refer to a level of an output voltage converted from a single electron, and may be inversely proportional to a capacitance of an FD node. The capacitance of the FD node may be greatly affected by a number of junctions and an overlap with a transfer gate. In a 4×2 shared architecture, a relatively large number of transfer gates may be in contact with the junctions, and thus, an increase of the conversion gain may be limited.

In order to overcome deterioration in a sensitivity of a color image, a 4×2 shared pixel architecture in which sharing of an FD node may be adaptively adjusted will be described with reference to FIG. 12.

Figure 12:
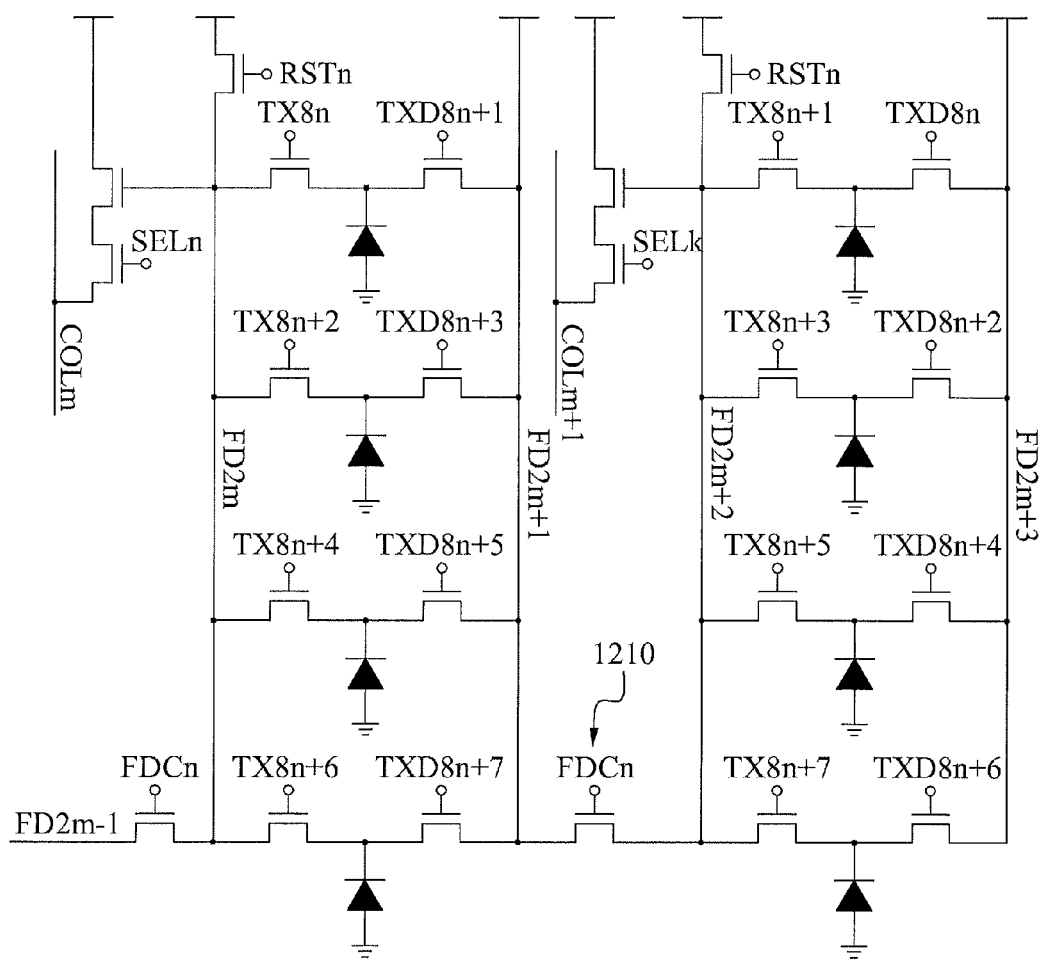
FIG. 12 illustrates an exemplary 4×2 pixel architecture additionally including a switch, according to example embodiments.

FIG. 12 illustrates an exemplary 4×2 pixel architecture additionally including a switch, according to example embodiments.

Referring to FIG. 12, the notation of n and m denote a predetermined row and a predetermined column, respectively. A basic concept suggested through FIG. 12 is controlling a number of FD nodes to be shared, using a switch 1210, for example, a floating diffusion capacitor (FDC). In a color mode for capturing a color image, the switch 1210 may be turned OFF to reduce a capacitance of an FD node. In a depth mode for capturing a depth image, the switch 1210 may be turned ON, and electrons generated from eight photodiodes, for example, may be used as shown in FIG. 5.

Figure 13:
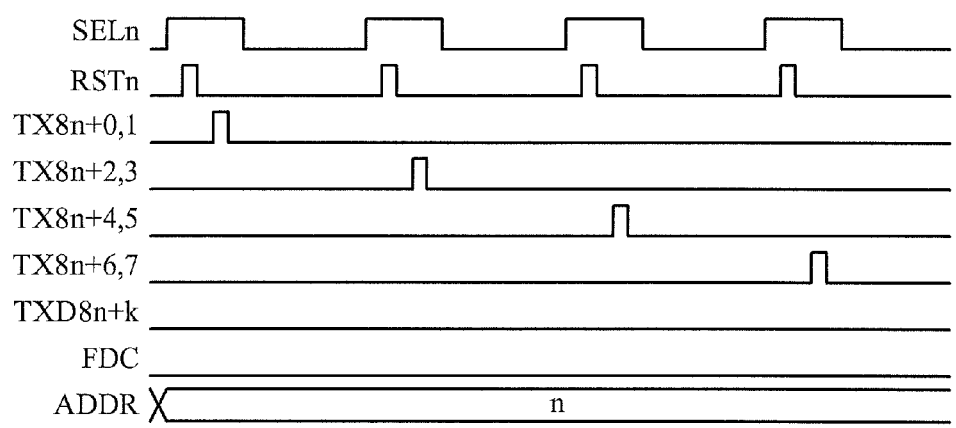
FIG. 13 illustrates an exemplary timing diagram for a color mode of the pixel architecture of FIG. 12.

FIG. 13 illustrates an exemplary timing diagram for a color mode of the pixel architecture of FIG. 12.

Referring to FIG. 13, in the color mode, a signal input into a pixel may indicate a rolling shutter operation. A transfer gate may be connected at a time of reading out a line of each pixel, and charges collected in a photodiode of the pixel may be transferred to an FD node. In this instance, an operation of the switch 1210 and the transmit data (TXD) signals may be indicated with a broken line in FIG. 14.

Figure 14:
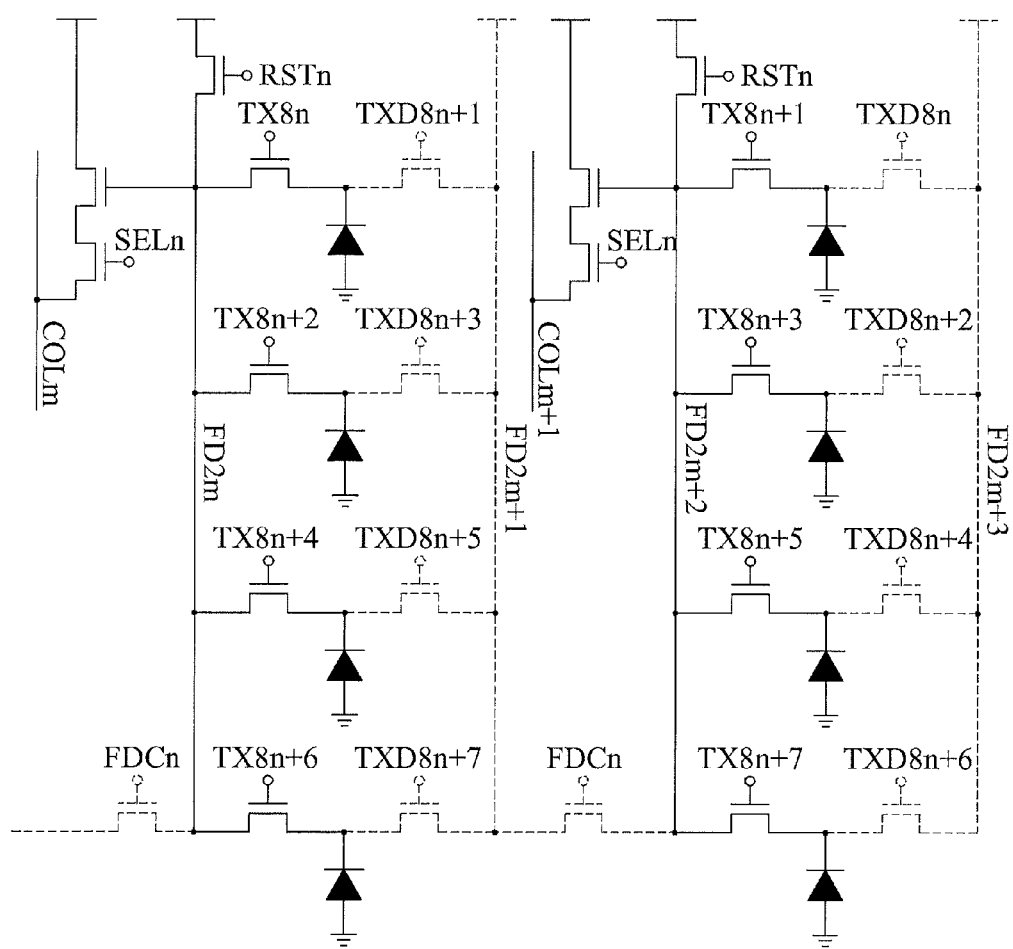
FIG. 14 illustrates an exemplary circuit state during an operation of the pixel architecture of FIG. 12 in a color mode.

FIG. 14 illustrates an exemplary circuit state during an operation of the pixel architecture of FIG. 12 in a color mode. Referring to FIG. 14, portions indicated with a broken line may be in an OFF state, and may be out of operation.

Figure 15:
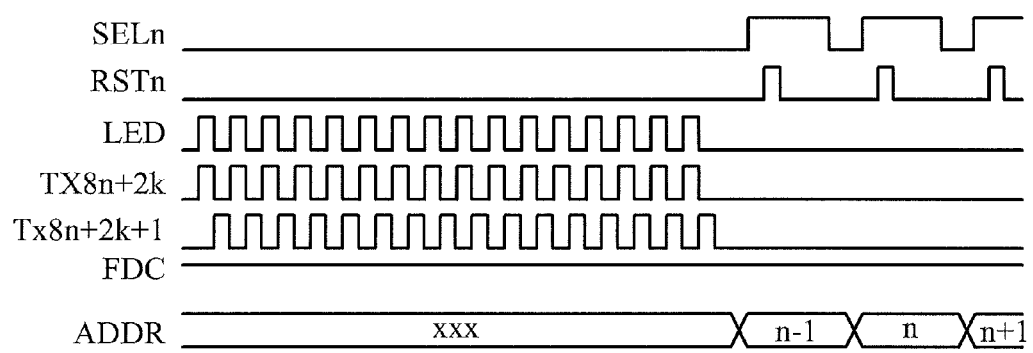
FIG. 15 illustrates an exemplary timing diagram for a depth mode of the pixel architecture of FIG. 12.

FIG. 15 illustrates exemplary timing diagram for a depth mode of the pixel architecture of FIG. 12.

Referring to FIG. 15, an LED signal and a TX signal may be synchronized in the depth mode. The TX signal may operate globally, charges may be accumulated for an integration time during which a signal modulated in the LED may be output, and the charges may be read out for each row, similar to the color mode. In this instance, contrary to the color mode, the switch 1210 (FDC) may be in an ON state.

The 4×2 pixel architecture of FIG. 12 has been provided as an example, and the pixel architecture may be implemented in a similar form for another type of sharing.

In an image sensor, circuits performing correlated double sampling (CDS) and analog-to-digital conversion (ADC) for removing noise of a pixel and converting a pixel value into a digital signal may be integrated. Recently, a number of image sensors may be configured to be column-parallel, in particular, may be configured such that a circuit may be disposed in each single column and multiple circuits may operate simultaneously. A physical arrangement may be difficult because a single column pitch may decrease as a size of a pixel decreases. Accordingly, a single circuit may be disposed for each pair of columns, an upper column and a lower column. Hereinafter, a circuit disposed for each column to perform the CDS and the ADC will be referred to as a column readout circuit.

Figure 16:
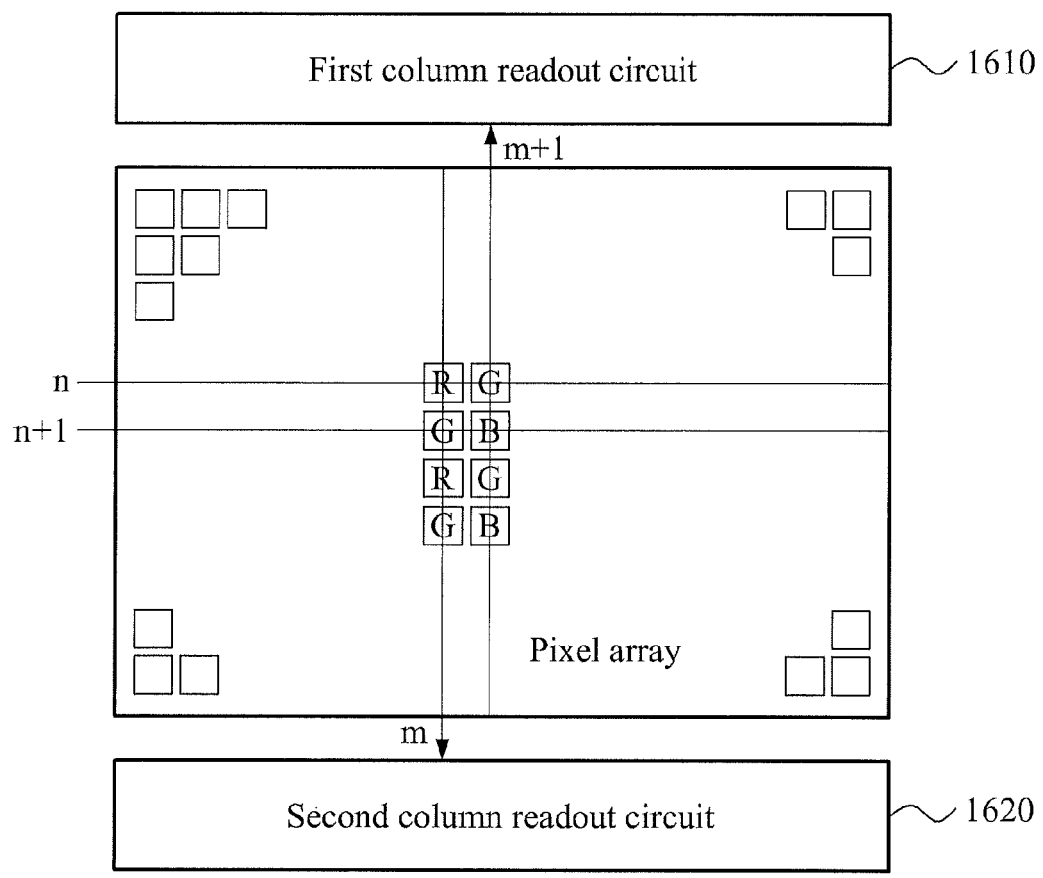
FIG. 16 illustrates an exemplary brief configuration of an image sensor having the pixel architecture of FIG. 5.

FIG. 16 illustrates an exemplary brief configuration of an image sensor having the pixel architecture of FIG. 5.

Referring to FIG. 16, in a case of an even column, a pixel value may be read out through a second column readout circuit 1620 disposed on a lower side. In a case of an odd column, a pixel value may be read out through a first column readout circuit 1610 disposed on an upper side.

In this instance, in a case of an image sensor having the pixel architecture of FIG. 14, pixel values of Gr pixels disposed in even columns, and pixel values of Gb pixels disposed in odd columns may be read out through column readout circuits disposed at different positions, respectively. Although the pixel value of the Gr pixel should be identical to the pixel value of the Gb pixel, a difference between the Gr pixel and the Gb pixel may increase.

In a case of the 4×2 pixel architecture of FIG. 5, directions of electron transfer may be controlled by properly adjusting a TX for each column, whereby a Gr pixel and a Gb pixel may be read out through an identical column readout circuit. However, the 4×2 pixel architecture of FIG. 14 may be similar to the configuration of FIG. 16, and controlling of a direction of electron transfer may be impossible. In particular, in the 4×2 pixel architecture, because sharing of an FD node may be separate in the color mode, fixing the directions of electron transfer to a single direction may be necessary. In this regard, architectures as shown in FIGS. 17 and 18 are suggested.

Figure 17:
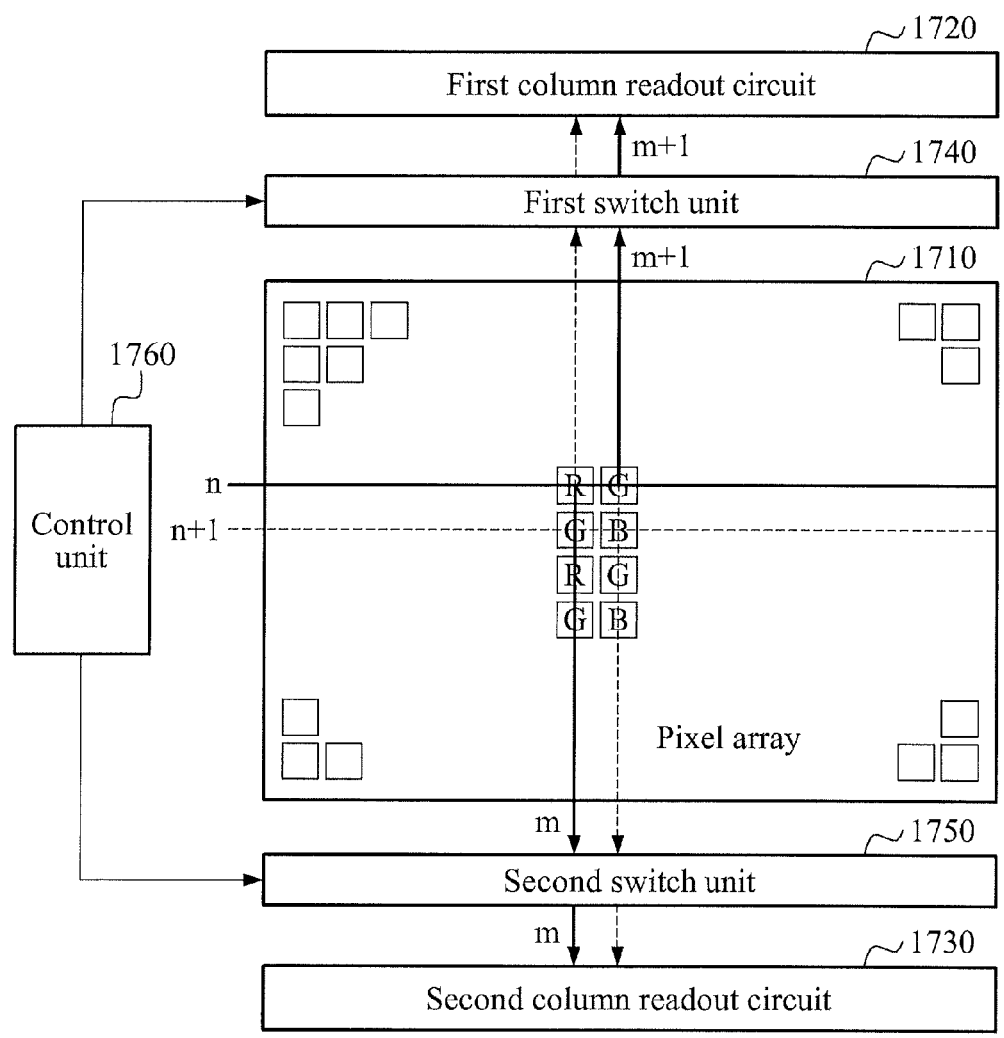
FIG. 17 illustrates an exemplary configuration of an image sensor having the pixel architecture of FIG. 14 and an operation in an $n^{th}$ column.

FIG. 17 illustrates an exemplary configuration of an image sensor having the pixel architecture of FIG. 14 and an operation in an $n^{th}$ column.

Figure 18:
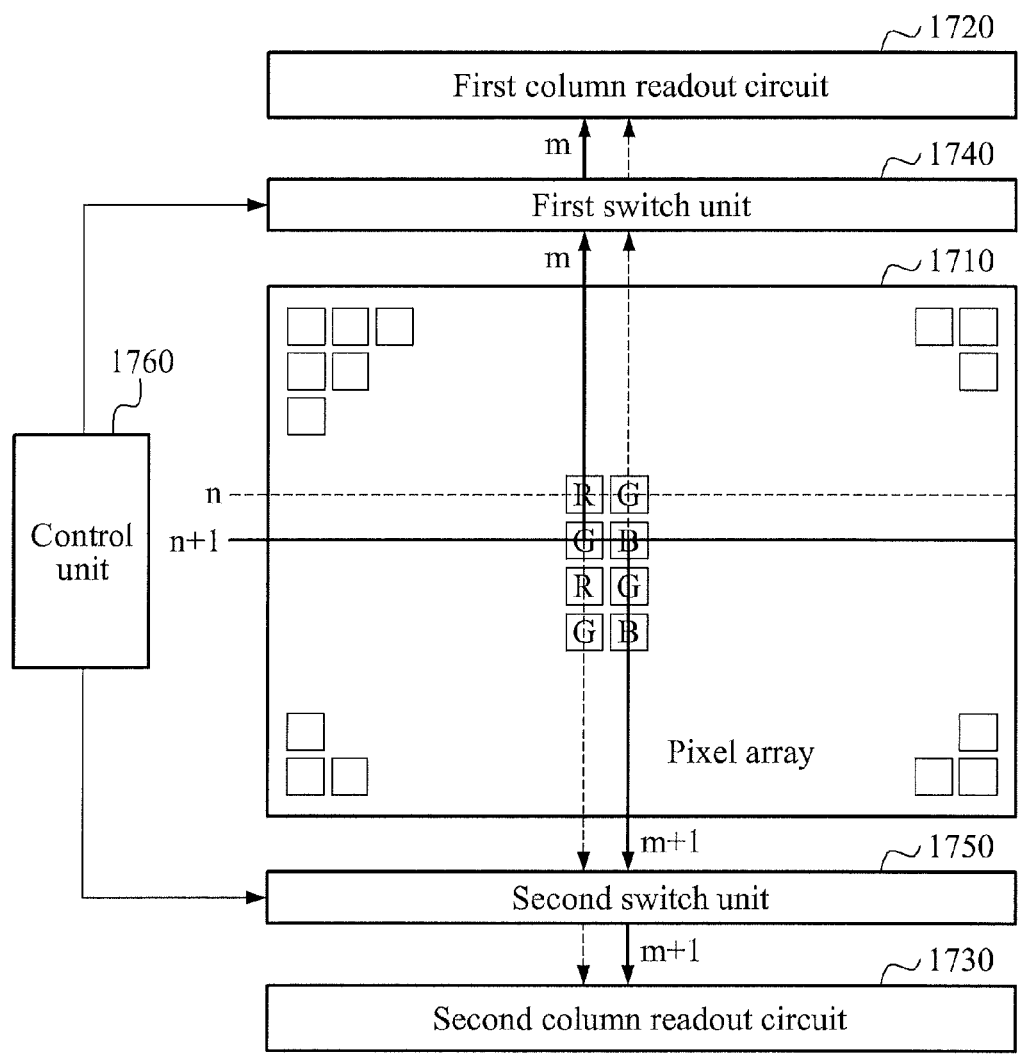
FIG. 18 illustrates an exemplary configuration of an image sensor having the pixel architecture of FIG. 14 and an operation in an $n+1^{th}$ column.

FIG. 18 illustrates an exemplary configuration of an image sensor having the pixel architecture of FIG. 14 and an operation in an $n+1^{th}$ column.

Referring to FIGS. 17 and 18, the image sensor according to example embodiments may include a pixel array unit 1710, a first column readout circuit 1720, a second column readout circuit 1730, a first switch unit 1740, a second switch unit 1750, and a control unit 1760.

All columns of the pixel array unit 1710 may be connected to both the first column readout circuit 1720 disposed in an upper area and the second column readout circuit 1730 disposed in a lower area.

The pixel array unit 1710 may include a first pixel and a second pixel. In this instance, the pixel array unit 1710 may further include a control switch (not shown) to control an electrical connection between a first FD node of the first pixel and a second FD node of the second pixel.

The first switch unit 1740 may be disposed between the pixel array unit 1710 and the first column readout circuit 1720, and the second switch unit 1750 may be disposed between the pixel array unit 1710 and the second column readout circuit 1730. The first switch unit 1740 may connect the pixel array unit 1710 with the first column readout circuit 1720, based on a control of the control unit 1760. The second switch unit 1750 may connect the pixel array unit 1710 with the second column readout circuit 1730, based on a control of the control unit 1760.

In FIGS. 17 and 18, a bold line may indicate being activated through the first switch unit 1740 and the second switch unit 1750, and a fine broken line may indicate being deactivated.

When a pixel value of an even row is read out, the control unit 1760 may connect an even column to the second column readout circuit 1730 disposed in the lower area, and may connect an odd column to the first column readout circuit 1720 disposed in the upper area. In addition, when a pixel value of an odd row, as opposed to the even row, is read out, the control unit 1760 may connect the even column to the first column readout circuit 1720 disposed in the upper area, and may connect the odd column to the second column readout circuit 1730 disposed in the lower area. By reading out pixel values from the pixel array unit 1710 in a manner described above, all green pixels may be read out through the first column readout circuit 1720 disposed in the upper area, whereby a Gr-Gb difference may be minimized.

In particular, the control unit 1760 may control green pixels to be read out by a single column readout circuit, and may control blue pixels and red pixels to be read out by another column readout circuit.

The image sensor according to example embodiments may include a first pixel and a second pixel, similar to the array unit 1710 of FIG. 17. In this instance, the image sensor may include a control switch to control an electrical connection between a first FD node of the first pixel and a second FD node of the second pixel.

In this instance, the control switch may electrically connect the first FD node and the second FD node in a color mode for capturing a color image, and may release the electrical connection between the first FD node and the second FD node in a depth mode for capturing a depth image.

In this instance, at least one of the first pixel and the second pixel may include a pixel readout circuit similar to the second column readout circuit 1730 of FIG. 17. In this instance, the pixel readout circuit may be connected to the second FD node.

A pixel of the image sensor may sense at least one of a visible light and an infrared ray. Accordingly, the first pixel and the second pixel may sense at least one of the visible light and the infrared ray.

In addition, a pixel of the image sensor may include a pinned photo diode (PPD). Accordingly, the first pixel and the second pixel may include PPDs, respectively.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image sensor, comprising:
a first pixel including a first floating diffusion (FD) node;
a second pixel including a second FD node; and
a control switch,
the image sensor configured to operate in a color mode and a depth mode,
the color mode a mode in which the image sensor captures a color image,
the depth mode a mode in which the image sensor captures a depth image,
the control switch configured to electrically connect the first FD node and the second FD node when the image sensor is operating in the depth mode,
the control switch configured to release the electrical connection between the first FD node and the second FD node when the image sensor is operating in the color mode,
the first and second pixels configured to sense visible light and an infrared ray.

2. The image sensor of claim 1, wherein when in the depth mode for capturing the depth image, the control switch electrically connects the first FD node and the second FD node, and when in the color mode for capturing the color image, the control switch releases the electrical connection between the first FD node and the second FD node.

3. The image sensor of claim 1, wherein at least one of the first pixel and the second pixel comprises a pixel readout circuit connected to the second FD node.

4. The image sensor of claim 1, wherein the first pixel and the second pixel comprise pinned photo diodes (PPDs).

5. An image sensor, comprising:
a pixel array configured in an m×n pixel architecture;
a first column readout circuit and a second column readout circuit each connected to all columns included in the pixel array;
a first switch circuit disposed between the pixel array and the first column readout circuit and configured to switch a connection between a column of the pixel array and the first column readout circuit, based on a control of a controller;
a second switch circuit disposed between the pixel array and the second column readout circuit and configured to switch a connection between a column of the pixel array and the second column readout circuit, based on the control of the controller; and
the controller configured to control the first switch circuit and the second switch circuit for green pixels, from among pixels included in the m×n pixel architecture, to be read out by one of the first column readout circuit and the second column readout circuit,
wherein the pixel array includes,
a first pixel including a first floating diffusion (FD) node,
a second pixel including a second FD node, and
a control switch,
the image sensor configured to operate in a color mode and a depth mode,
the color mode a mode in which the image sensor captures a color image,
the depth mode a mode in which the image sensor captures a depth image,
the control switch configured to electrically connect the first FD node and the second FD node when the image sensor is operating in the depth mode,
the control switch configured to release the electrical connection between the first FD node and the second FD node when the image sensor is operating in the color mode, and
the first and second pixels configured to sense visible light and an infrared ray.

6. The image sensor of claim 5, wherein the first column readout circuit is disposed above the pixel array and configured to remove a noise of a pixel and to convert a pixel value into a digital signal, and the second column readout circuit is disposed under the pixel array and configured to remove a noise of a pixel and to convert a pixel value into a digital signal.

7. The image sensor of claim 5, wherein the controller is configured to control the first switch circuit for the green pixels, from among the pixels included in the m×n pixel architecture, to be read out by the first column readout circuit, and control the second switch circuit for blue pixels and red pixels, from among the pixels included in the m×n pixel architecture, to be read out by the second column readout circuit.

8. The image sensor of claim 5, wherein the controller is configured to control the second switch circuit for the green pixels, from among the pixels included in the m×n pixel architecture, to be read out by the second column readout circuit, and control the first switch circuit for blue pixels and red pixels, from among the pixels included in the m×n pixel architecture, to be read out by the first column readout circuit.

9. The image sensor of claim 5, wherein the pixels included in the m×n pixel architecture of the pixel array share a FD node located in an identical column, and a pixel readout circuit connected to the FD node.

10. The image sensor of claim 5, wherein:
different signals are inputted into the pixels included in the m×n pixel architecture, respectively, in a color mode, and
an identical signal is inputted into the pixels included in the m×n pixel architecture, in a depth mode.

11. The image sensor of claim 5, wherein a pixel included in the m×n pixel architecture shares the FD node with a neighboring pixel, in a depth mode.

12. The image sensor of claim 5, wherein the m×n pixel architecture corresponds to a 4×2 pixel architecture.

13. The image sensor of claim 12, wherein pixels included in the 4×2 pixel architecture share a single FD node in a depth mode.

14. The image sensor of claim 5, wherein when in the depth mode for capturing the depth image, the control switch electrically connects the first FD node and the second FD node, and when in the color mode for capturing the color image, the control switch releases the electrical connection between the first FD node and the second FD node.

15. The image sensor of claim 5, wherein charges of pixels are transferred in one of a horizontal and vertical direction to a shared FD node.

* * * * *